(12) United States Patent
Saeki et al.

(10) Patent No.: US 10,324,915 B2
(45) Date of Patent: Jun. 18, 2019

(54) INFORMATION PROCESSING APPARATUS, PROCESSING APPARATUS, DATA SEARCH METHOD

(71) Applicant: Hitachi, Ltd., Tokyo (JP)

(72) Inventors: Yuji Saeki, Tokyo (JP); Satoru Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 119 days.

(21) Appl. No.: 15/397,779

(22) Filed: Jan. 4, 2017

(65) Prior Publication Data

US 2017/0228404 A1    Aug. 10, 2017

(30) Foreign Application Priority Data

Feb. 5, 2016 (JP) .................................. 2016-020805

(51) Int. Cl.
*G06F 16/22* (2019.01)
*G06F 16/245* (2019.01)

(52) U.S. Cl.
CPC ........ *G06F 16/221* (2019.01); *G06F 16/2272* (2019.01); *G06F 16/245* (2019.01)

(58) Field of Classification Search
CPC ..... G06F 16/221; G06F 16/245; G06F 16/227
See application file for complete search history.

(56) References Cited

U.S. PATENT DOCUMENTS

| 5,794,228 A * | 8/1998 | French ............. G06F 17/30315 |
| 2001/0044795 A1* | 11/2001 | Cohen ............... G06F 17/30699 |
| 2003/0037034 A1* | 2/2003 | Daniels ................ G06Q 10/087 |
| 2003/0123671 A1* | 7/2003 | He ..................... G06F 17/30595 |
| | | 380/282 |
| 2005/0055357 A1* | 3/2005 | Campbell .................. G06F 8/61 |
| 2012/0084278 A1 | 4/2012 | Franke et al. |
| 2014/0032528 A1* | 1/2014 | Mandre ............ G06F 17/30463 |
| | | 707/718 |
| 2017/0293644 A1* | 10/2017 | Kurokawa ............ G06F 16/221 |

FOREIGN PATENT DOCUMENTS

WO   2015/162752 A1   10/2015

* cited by examiner

*Primary Examiner* — Jay A Morrison
(74) *Attorney, Agent, or Firm* — Mattingly & Malur, PC (57) ABSTRACT

An information processing apparatus includes a processor, a plurality of storage devices, and an FPGA. The plurality of storage devices stores a plurality of items of segment data. Each item of segment data includes configuration information on a configuration of the segment data. A search command in which search target segment data and a search formula for the database are described is received from a host computer. The FPGA reads the configuration information relating to the search target segment data, analyzes the search formula to specify column data to be used for search, specifies, based on the read configuration information, a storage location of the specified column data in the search target segment data, reads column data to be used by the specified search target from the storage device in which the search target segment data is stored and executes search, and returns the search result to the host computer.

15 Claims, 11 Drawing Sheets

INFORMATION PROCESSING APPARATUS, PROCESSING APPARATUS, DATA SEARCH METHOD

CROSS-REFERENCE TO PRIOR APPLICATION

This application relates to and claims the benefit of priority from Japanese Patent Application number 2016-020805, filed on Feb. 5, 2016 the entire disclosure of which is incorporated herein by reference.

BACKGROUND OF THE INVENTION

The present invention generally relates to a data search technique for a processing apparatus.

In enterprise activities, utilization of a large amount of generated business data has become indispensable. A column store database (hereinafter "column store DB") is known as a database (DB) for efficiently storing and analyzing a large amount of business data. In general, a database includes a table and a table includes a plurality of rows, and a plurality of values corresponding to a plurality of data items (columns) is recorded in each row (such values are hereinafter called "column values"). In the column store DB, a plurality of column values in a plurality of records is stored in an area corresponding to each column. The column store DB can also be stored in a main memory of a server. However, the cost (for example, a bit cost) for the main memory per unit capacity is generally higher than for an external storage apparatus. Thus, in a system that handles a large amount of data, the column store DB is generally stored in an external storage apparatus configured as a HDD or a flash storage.

US Patent Application Publication No. 2012/84278 discloses an in-memory column DB system in which each query in a column store DB of an in-memory type has at least one column predicate, a column required for scan is determined for each query, a plurality of queries is grouped into a scan group based on the determination, and the column predicate is evaluated for the queries of the scan group according to a schedule plan. WO 2015/162752 discloses a storage apparatus which includes a controller and a storage medium, and in which the storage medium includes one or more flash modules having a database operation unit, and the controller receives an operation request on a row store DB to cause the flash module to execute the received operation request on the row store DB.

SUMMARY OF THE INVENTION

The column store DB disclosed in US Patent Application Publication No. 2012/84278 is of an in-memory type, in which the processor reads data that is stored in a memory inside a server, and thereby processes the respective queries. Here, when data is stored in an external storage apparatus, the throughput of data read decreases remarkably. In WO 2015/162752, on the other hand, while the database operation unit of the storage medium executes an operation on the row store DB, the row store DB and the column store DB have different data structures. That is, the row store DB manages data in units of rows, whereas the column store DB manages data in units of columns. Therefore, the data operation process on the row store DB disclosed in WO 2015/162752 cannot be applied to the column store DB in the same manner. Moreover, the database operation unit is provided in each storage medium, and an operation on data over a plurality of the storage media is not taken into consideration. In these circumstances, an object of the present invention is to improve data search throughput while suppressing a processor load. Other objects will be apparent in the following description.

An information processing apparatus according to an embodiment includes a processor; a plurality of storage devices; and a programmable logic device. The plurality of storage devices stores a plurality of items of segment data which are constituent elements of a database. Each item of segment data includes configuration information on a configuration of the segment data. The processor receives, from a host computer, a search command in which search target segment data and a search formula for the database are described, delivers the received search command to the programmable logic device, and returns a result of search by the programmable logic device to the host computer. The programmable logic device reads the configuration information relating to the search target segment data, analyzes the search formula to specify column data to be used for search, specifies, based on the read configuration information, a storage location of the specified column data in the search target segment data, and reads column data to be used by the specified search target from the storage device in which the search target segment data is stored and executes search.

According to the present invention, a data search speed can be improved.

DESCRIPTION OF THE PREFERRED EMBODIMENTS

Hereinafter, embodiments will be described. In the following description, although information is sometimes described using the expression "xxx table", the information may be expressed by any data structure. That is to say, the expression "xxx table" can be interchanged with the expression "xxx information", indicating that the information is independent of the data structure. Moreover, in the following description, when elements of the same type are distinguished from each other, reference numerals may be used such as "search command 100A" and "search command 100B", and when elements of the same type are not distinguished from each other, then only the number that is common to the reference numerals may be used such as "search command 100".

Figure 1:
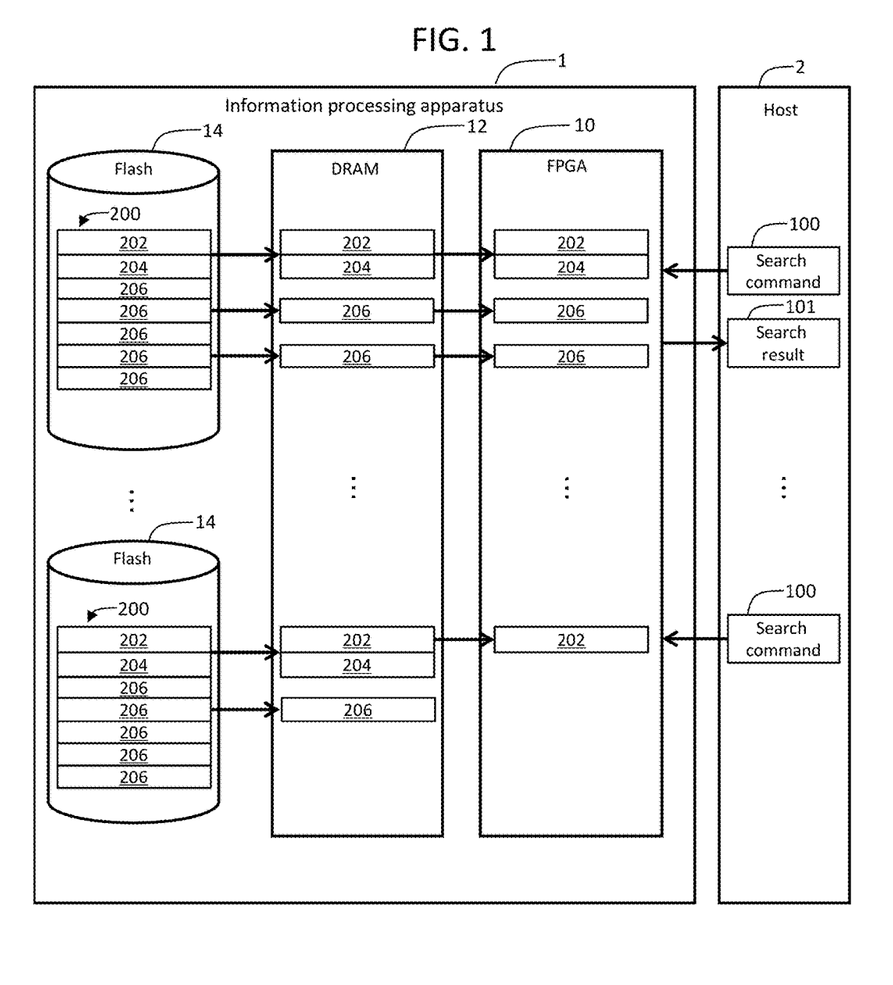
FIG. 1 is a diagram for describing an outline of an information processing apparatus according to the present invention.

FIG. 1 is a diagram for describing an outline of an information processing apparatus 1 according to the present embodiment.

The information processing apparatus 1 includes a flash storage 14 which is an example of a storage device, a dynamic random access memory (DRAM) 12 which is an example of a memory, and a FPGA 10 which is an example of a programmable logic device.

Here, the access time of the flash storage 14 is incomparably greater than the access time of the DRAM 12. Moreover, as for the read throughput of the flash storage 14, in order to transfer data with satisfactory performance, it is necessary to issue a plurality of read requests for data of a large size stored in a successive area so that read operations from a plurality of flash storages 14 are performed in parallel. When a database stored in the flash storage 14 is searched, it is necessary to divide a table into a plurality of items of segment data 200 of a certain size (for example, 8 MB) so as to be distributed, and stored, over the plurality of flash storages 14, and to issue a read request simultaneously to the plurality of items of segment data in order to improve throughput.

Thus, an apparatus is considered in which the DRAM 12 having higher I/O performance than the flash storage 14 is used as a buffer area of data read in parallel from a plurality of items of segment data 200, and the FPGA 10 stores data loaded from the DRAM 12 in a static random access memory (SRAM) 32 having higher I/O performance than the DRAM 12 in the FPGA 10 and performs search, and which has a tiered memory configuration in relation to a data capacity and an access time and which accelerates large-capacity database search. When a row store DB is searched using such an apparatus, if column data only used for searching is read, since the unit of access becomes too fine and satisfactory throughput is not obtained. If all of column data divided into a certain size is read, the search throughput decreases because there is a large amount of column data which is not used.

On the other hand, in the column store DB, since data is stored in a successive area in respective columns, it is possible to read only the column data to be used for search with high throughput. Furthermore, when data is compressed according to a method optimal for respective columns, it is possible to decrease the amount of data to be read and to improve the search throughput.

However, since data (that is, the entire one item of column data) of all records in respective columns is generally stored in a successive area of a flash storage, a dictionary size of the entire one item of column data compressed in a dictionary manner increases. When search of this storage-type column store is to be accelerated using the FPGA 10, a dictionary may be held in the SRAM 32 which is an example of an internal memory of the FPGA 10 and record that hit a search condition may be found from the dictionary and decoded. However, the entire one item of column data has a relatively large dictionary size and is not easily stored in the SRAM 32.

Moreover, when data stored in a successive area is divided, in respective columns, into a certain size and read in a similar manner to a row store accelerating FPGA, the number of records per data size is different from column to column, resulting in an increase in the proportion, to the entire processing time, of a read time for an area that stores columns in which a compression ratio is low and the data length is large. This leads to the impossibility to accelerate a search process.

The information processing apparatus 1 according to the present embodiment divides a column store DB into a plurality of items of segment data and stores the same to be distributed over a plurality of flash storages 14 to limit the maximum size of the dictionary of the respective items of segment data 200 so as to fall within the capacity of the SRAM 32 of the FPGA 10. The segment data 200 may include a plurality of pages which is the unit of read. The FPGA 10 may execute a process of analyzing a search formula given from a host computer 2 to acquire a column number while reading the configuration information stored in a starting entry page 202 of the segment data 200 and the dictionary information stored in a dictionary storage page 204 subsequent thereto, and reading column data to be used for search only with respect to a plurality of items of segment data 200. In this way, since the access time of the flash storage 15 is concealed and only the necessary data is read with high throughput, the search throughput is improved.

Next, an outline of an operation will be described with reference to FIG. 1.

The host computer 2 issues database search commands 100. Each search command 100 provides a processor 16 with a storage location of the segment data 200 in the flash storage 14, a search formula, and a page list in which a search result is stored. The segment data 200 is data obtained by dividing a search target database into a certain size. The page list is a list of pages in a memory that the host computer 2 can access. The host computer 2 can issue a plurality of search commands 100 at a time as long as the capacity of the DRAM 12 in which the data read from the flash storage 14 is buffered is allowed.

The processor 16 queues respective search formulas into the SRAM 32 inside the FPGA 10 and sends a request to the flash storage 14 to read respective items of configuration information (storage location information of column data) stored in the starting page (the entry page 202) of search target segment data into the DRAM 12.

Here, the read state of the storage location information of column data is managed for each item of segment data 200 and read of column data or activation of search circuit is selected as a process to be performed subsequently.

Here, since the access time of the flash storage 14 is large, it is preferable to increase the size of read data in order to improve the read performance. Thus, a dictionary 204 used for decrypting (for example, decompressing compressed column data) column data may be stored in a page immediately after the entry page 202 in which the storage location information of the column data is stored. In this way, when size of the dictionary 204 is equal to or smaller than a certain size, it is possible to read the dictionary and the storage location information of the column data in one access.

During the read access time, the processor 16 may perform a process of analyzing a search formula to specify columns to be used for search and sorting the columns by a column number. In this way, it is possible to reduce the amount of processing for creating column data read requests performed subsequently.

When completion of read of column data storage location information is detected, the processor 16 loads data from the DRAM 12 based on a search formula analysis result on the segment data 200, and acquires the storage location and the size of columns to be used for search.

The search command 100 for one item of segment data 200 is divided into subcommands of which each is a column data read request for column data in a successive area, and the read requests of column data used for search are sent to the flash storage 14 in a column data storage order (a column number order). Here, the data size may be increased by sending column read requests for small-size column data having successive numbers in a collective manner.

Moreover, the ID of "read submission entry" may be also referred to as a page number of a read data storage destination. In this way, with the ID included in a read completion notification, it is possible to specify columns and segments which the read completion notification is associated.

In a process of extracting the column storage location and the size from the DRAM 12, the latency of load is concealed by performing a process of specifying a word including the column storage location information appearing in the search formula while loading a word including the number of columns of a table and a dictionary size (which is information that does not depend on the search formula).

Furthermore, the latency is concealed by performing a process of calculating a byte location in the word, of the storage location information of the columns used for search while loading the word including the column storage location information, and the overhead of a column selection process performed by the processor 16 is reduced.

The processor 16 monitors the completion of read of subcommands and instructs a column store database search circuit of the FPGA 10 to start processing on the segment data 200 in which the read of all items of column data used for search is completed at the first time.

After that, a host memory page list indicating a search result storage destination pointed by the corresponding search command 100 is transferred to the SRAM 32 that the FPGA search circuit can refer to.

In this way, it is possible to reduce the capacity of the SRAM 32 to be used for storage of page lists and to increase the multiplicity of the segment data 200 which can be simultaneously read to the flash storage 14 to thereby maintain the search throughput of a column store database in which the number of columns of the search target table 300 or the proportion of data to be used depending on the search formula may be small.

The FPGA search circuit loads the storage location information of each item of column data from the address of the DRAM 12 in which the search target segment data 200 is stored and which is given by the processor 16, calculates a column storage address appearing in the search formula, loads the column data to be used for search in units of pages, and stores the column data in the SRAM 32 inside the FPGA 10.

The SRAM 32 may have a capacity required for pipeline-processing the data of one item of segment data 200. Since the SRAM 32 has a small access time, the FPGA search circuit may load a certain number of records of data from the SRAM 32, evaluate a search condition, and execute an aggregation function on hit records.

The FPGA search circuit performs processing sequentially on the segment data 200 in which the read of necessary column data into the DRAM 12 is completed. That is, the processor 16 monitors a completion response indicating the completion of a search process on the segment data 200 on which processing has been started and instructs the FPGA search circuit to start processing on a subsequent item of segment data 200 when the completion response is detected.

Figure 2:
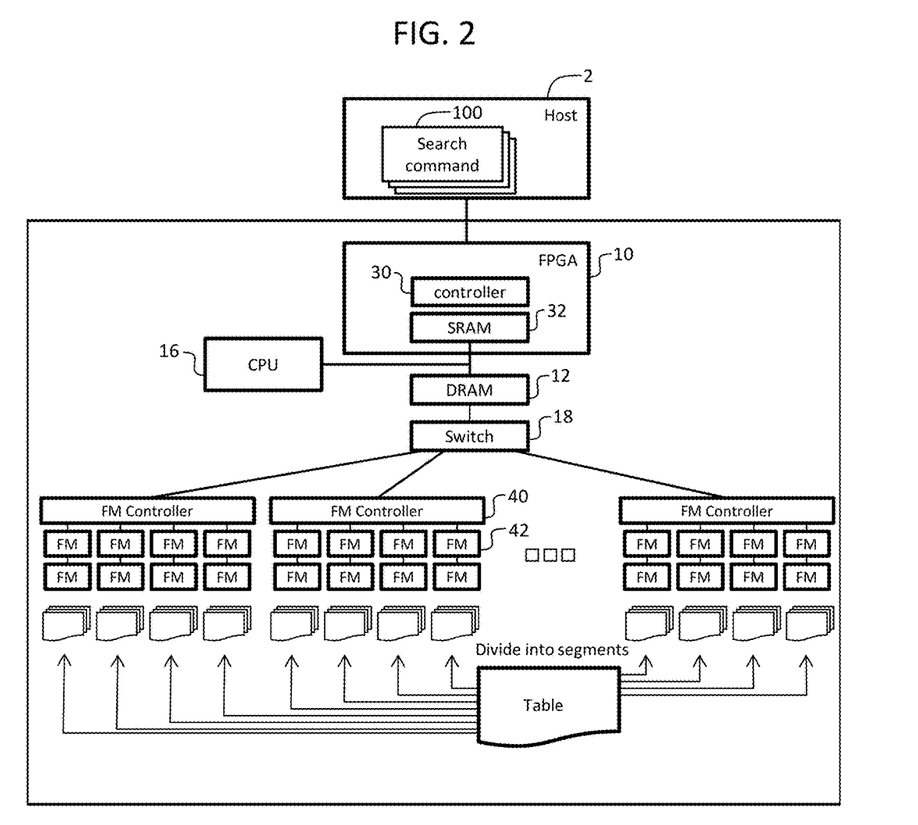
FIG. 2 is a diagram illustrating a configuration example of the information processing apparatus.

FIG. 2 illustrates a configuration example of the information processing apparatus 1.

The information processing apparatus 1 includes a CPU 16 which is an example of a processor, a DRAM 12 which is an example of a semiconductor memory, an FPGA 10 which is an example of a programmable logic device, and a plurality of flash storages 14 which is an example of a storage device. Another example of the semiconductor memory includes a magnetoresistive random access memory (MRAM), a ferroelectric random access memory (FeRAM), and a phase-change memory (PCM). Another example of the storage device includes a HDD or a combination of a flash storage and a HDD. The configuration of the FPGA 10 is not limited to the configuration described in the embodiment. For example, the FPGA may be configured so that a plurality of apparatuses performs a process performed by one apparatus in the FPGA. Moreover, the FPGA may be configured so that one apparatus performs processes performed by a plurality of apparatuses.

The CPU 16 realizes various functions of the information processing apparatus 1 by executing a program stored in the DRAM 12 or the SRAM 32. The CPU 16 may be a built-in processor included in the FPGA 10.

The FPGA 10 includes a FPGA controller 30 and the SRAM 32 which is an example of a semiconductor memory. Another example of the semiconductor memory includes a MRAM, a ReRAM, and a PCM. The SRAM 32 is coupled to the DRAM 12 via an internal bus. The DRAM 12 is coupled to a plurality of flash storages 14 via a switch 18. That is, the SRAM 32, the DRAM 12, and the flash storage 14 are coupled hierarchically in ascending order of access time when seen from the FPGA controller 30. The FPGA controller 30 is a logical circuit that realizes a function of accelerating column store database search. Data used from the FPGA controller 30 is stored in the SRAM 32.

The flash storage 14 includes a flash memory (FM) controller 40 and a plurality of flash memory (FM) chips 42. The FM controller 40 controls read, write, erasure, and the like of data with respect to the FM chip 42. The FM chip 42 is a nonvolatile storage device in which data can be read, written, and erased. The FM chip 42 may have an arbitrary configuration such as a NAND type or a NOR type.

One database table may be divided into a plurality of items of segment data 200 and stored to be distributed over the plurality of flash storages 14. In this way, the FPGA controller 30 can read data at a higher speed as compared to when one table is stored in one flash storage 14. This is because the FPGA 10 can read the segment data 200 in parallel from the plurality of flash storages 14.

The host 2 is a computer apparatus and can issue the search command 100 to the information processing apparatus 1 via a network or the like and receive a search result from the information processing apparatus 1.

Figure 3:
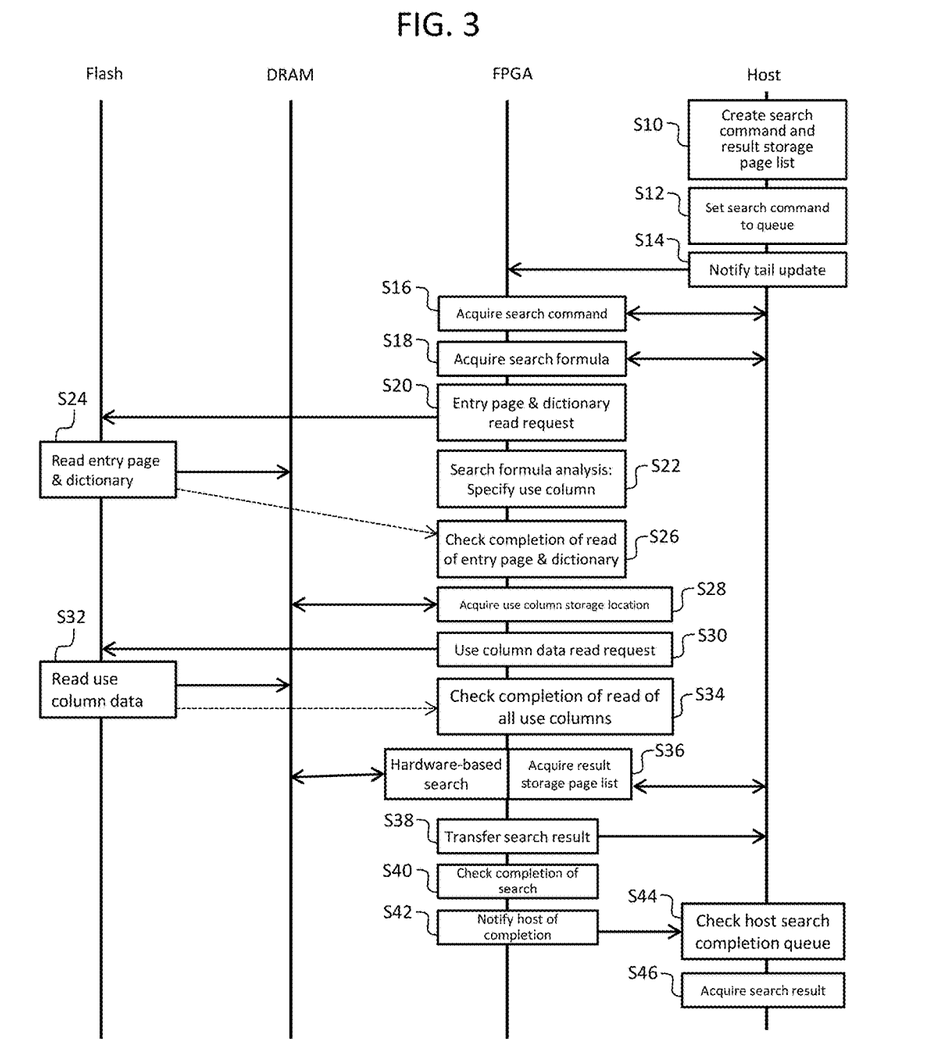
FIG. 3 is a sequence chart illustrating an example of an operation of the information processing apparatus.

FIG. 3 is a sequence chart illustrating an example of an operation of the information processing apparatus 1.
(S10)
The host 2 creates the search command 100 and a result storage page list. After that, the flow proceeds to the process of S12.
(S12)
The host 2 sets the search command 100 to a queue. After that, the flow proceeds to the process of S14.
(S14)
The host 2 notifies the FPGA 10 of a tail update. After that, the flow proceeds to the process of S16.
(S16, S18)

Upon receiving a tail update notification from the host 2, the FPGA 10 acquires the search command 100 and a search formula 150 from the host 2. After that, the flow proceeds to the process of S20.

(S20)

The FPGA 10 issues an entry page and a dictionary read request to the flash storage 14. After that, the flow proceeds to the process of S22.

(S22)

The FPGA 10 analyzes the search formula 150 without waiting for the completion of the process of S24 (to be described later) of the flash storage 14 and specifies use columns. After that, the flow proceeds to the process of S26. In this way, it is possible to utilize the resource of the FPGA 10 efficiently.

(S24)

Upon receiving the entry page and the dictionary read request from the FPGA 10, the flash storage 14 reads the entry page 202 and the dictionary 204 in the segment data 200 and stores the same in the DRAM 12. When the read operation is completed, the flash storage 14 issues a completion notification to the FPGA 10.

(S26)

Upon receiving the completion notification of the process of S24 from the flash storage 14, the FPGA 10 performs the process of S28.

(S28)

The FPGA 10 specifies the storage location of use columns in the segment data 200 from the entry page 202 and the dictionary 204 stored in the DRAM 12.

(S30)

The FPGA 10 issues a read request to read the use columns specified in the process of S22. The use column read request may include the storage location of the use columns in the segment data 200 specified in the process of S28.

(S32)

Upon receiving the use column read request from the FPGA 10, the flash storage 14 reads use columns from the storage location of the segment data 200 included in the read request and stores the use columns in the DRAM 12. When the read operation is completed, the flash storage 14 issues a completion notification to the FPGA 10.

(S34)

Upon receiving the completion notification of the process of S32 from the flash storage 14, the FPGA 10 performs the process of S36.

(S36)

The FPGA 10 executes search on the use columns stored in the DRAM 12. Simultaneously, the FPGA 10 acquires a result storage page list from the host 2. After that, the flow proceeds to the process of S38.

(S38)

The FPGA 10 stores the search result of S36 in the result storage page list. After that, the flow proceeds to the process of S40.

(S40, S42)

When completion of search is checked, the FPGA 10 issues a completion notification to the host 2.

(S44, S46)

The host 2 checks a search completion queue and acquires a search result when the search is completed.

Figure 4:
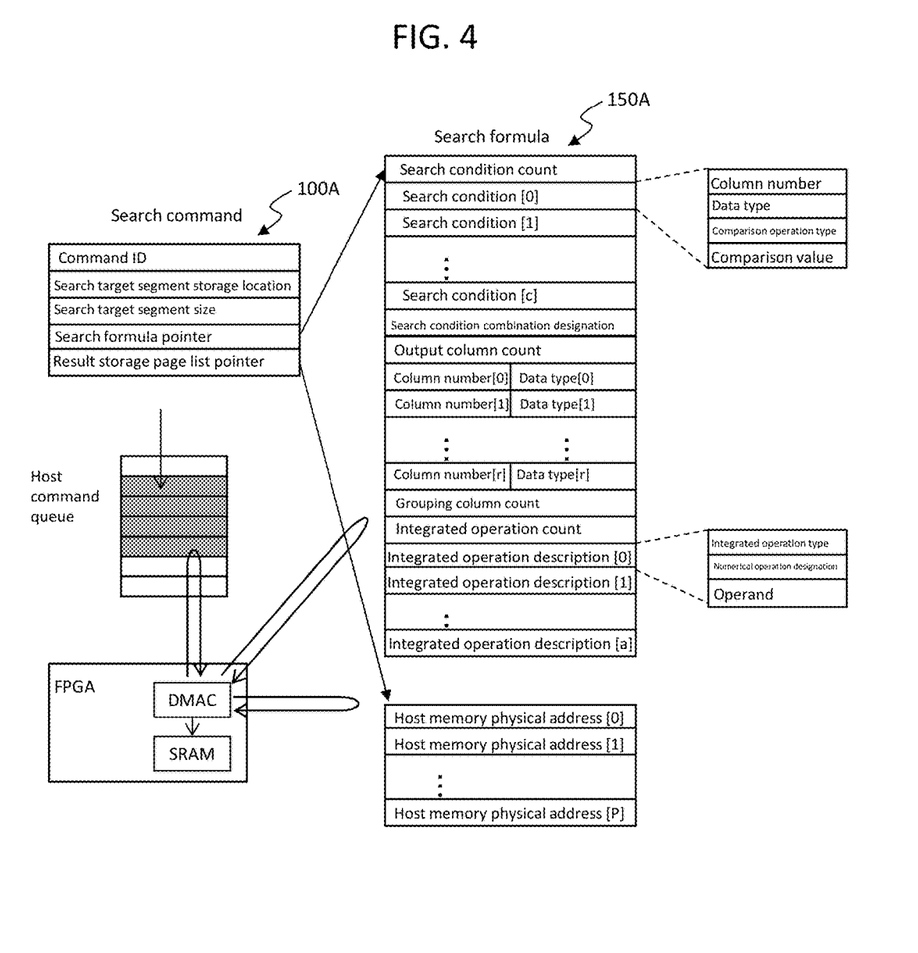
FIG. 4 is a diagram illustrating an example of a search command data format and a search formula.

FIG. 4 illustrates a format example of the search command 100 and the search formula 150.

The search command 100 is a command for allowing the host 2 to request the FPGA 10 to execute search. One search command 100 is issued to one item of segment data 200.

The search command 100 may include, as its item values, a command ID, a search target segment data storage location, a search target segment data size, a search formula pointer, and a result storage page list pointer. The command ID is an identifier of the search command 100. The search target segment data storage location is information on the location at which the search target segment data 200 is stored. The search target segment data size is the size of the search target segment data 200. The search formula pointer is a pointer indicating a storage destination address of the search formula. The result storage page list pointer is a pointer indicating a securing destination of the search result page list. The result storage page list may be secured on a memory of the host 2.

The search formula 150 may include, as its item values, a search condition count, a search condition, a search condition combination designation, an output column count, a column number and data type, a grouping column count, an aggregate operation count, and an aggregate operation description. The search condition count is the number of search conditions. The search condition is information indicating the condition of search and may include a column number, a data type, a comparison operation type, and a comparison value. The search condition combination designation is information designating a and/or combination of search conditions. The output column count is the number of sets of column number and data type of columns included in the search result. The column number and data type is information indicating a column number in the column store DB and a data type of the column. The grouping column count is the number of columns used for grouping the search result. The aggregate operation count is the number of aggregate operation descriptions. The aggregate operation description is information indicating the aggregate operation type, a numerical operation designation, and an operand.

Figure 5:
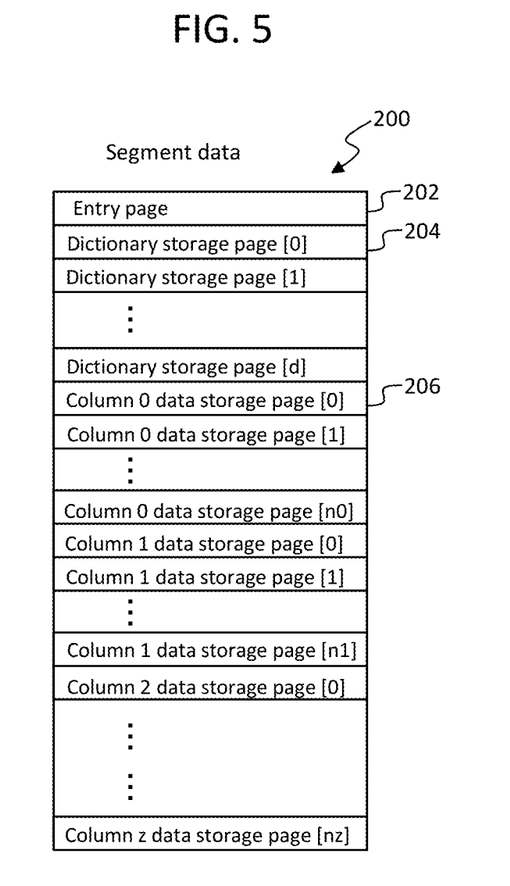
FIG. 5 is a diagram illustrating an example of a format of segment data.

FIG. 5 illustrates an example of a format of the segment data 200.

The segment data 200 may include the entry page 202, a dictionary storage page 204 of each column, and a data storage page 206 of each column. The size of each page may correspond to the unit of read.

Configuration information which is information on a configuration of the segment data 200 is stored in the entry page 202. The details of the configuration information stored in the entry page 202 will be described later (see FIG. 6). The entry page 200 may be one page at the start of the segment data 200. That is, the size of the configuration information may be equal to or smaller than the size of one page.

Dictionary information for decrypting data stored in the data storage page 206 is stored in the dictionary storage page 204. In the segment data 200, the entry page 202 and the plurality of dictionary storage pages 204 may be disposed successively. In this way, it is possible to read the configuration information and the dictionary information collectively (sequentially).

The column data is stored in the data storage page 206. The segment data 200 may store at least a portion of column data of different column numbers in a plurality of data storage pages 206. In this way, when certain column data is read, it is possible to read items of segment data including the column data thereof, which is stored to be distributed over the plurality of flash storages 14 in parallel.

The dictionary information of one dictionary storage page 204 and the column data of one column number stored in at least one data storage page 206 may be correlated with each other in one-to-one correlation (in units of columns). For example, the column data of the column number "1" stored in at least one data storage page 206 may be compressed based on the dictionary information of the column number "1" stored in one dictionary storage page 204. In other words, the column data of the column number "1" stored in at least one data storage page 206 may be decompressed by the dictionary information of the column number "1" stored in one dictionary storage page 204. In this way, since one item of dictionary information included in the segment data 200 needs to have only the information for decrypting the column data included in the segment data, the size of the dictionary information has an upper limit. Therefore, the FPGA 10 can read the dictionary information from the segment data 200 into the SRAM (internal memory) and decrypt the column data of the segment data 200. That is, it is possible to decompress the compressed column data at a high speed using the FPGA 10.

Figure 6:
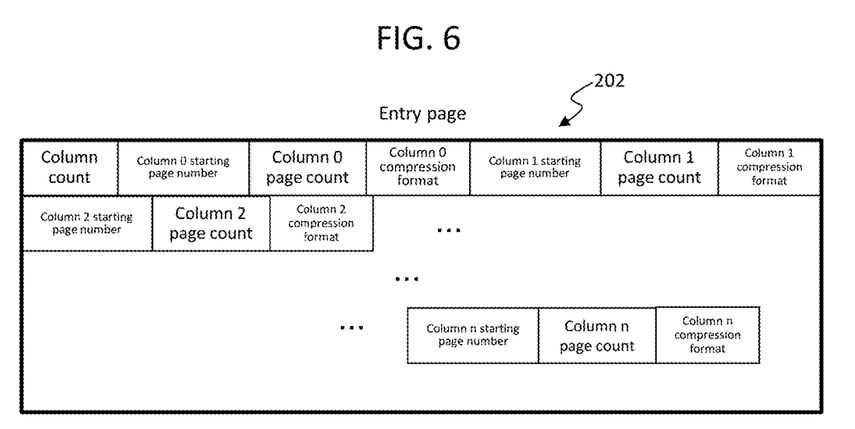
FIG. 6 is a diagram illustrating an example of a format of an entry page.

FIG. 6 illustrates an example of the configuration information stored in the entry page 202.

The configuration information may include a column count, a starting page number of each column, a page count of each column, a compression format of each column. The column count is the number of columns included in the segment data 200. The starting page number of the column is a starting page number of the data storage page of the column in the segment data 200. The page count of the column is the number of pages in which the column data of the segment data 200 stores. The compression format of the column is information indicating a data compression method of the data storage page of the column. By referring to the configuration information, it is possible to acquire desired column data in the segment data 200. Moreover, the starting page number of the column 0 indicates a page count of an area in which the entry page and the dictionary storage page are stored, and this starting page count can be used for determining whether all dictionary pages are read into the DRAM 12 together with the entry page.

Figure 7:
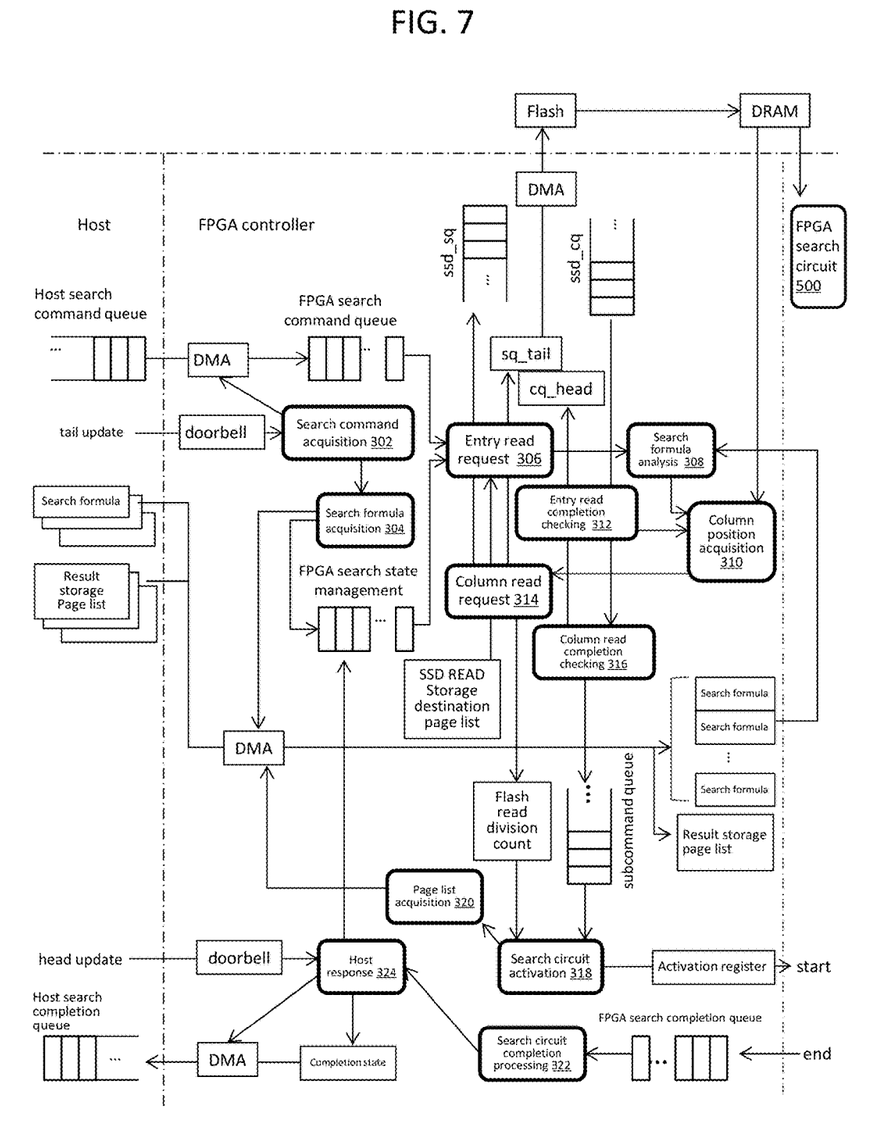
FIG. 7 is a diagram illustrating an example of an operation of a field programmable gate array (FPGA)

FIG. 7 illustrates an example of the operation of the FPGA 10.

Upon detecting the update of a doorbell register, a search command acquisition unit 302 transfers, via a direct memory access (DMA), one search command 100 stored in a host search command queue of a host memory to a FPGA search command queue in the FPGA 10. Moreover, the search command acquisition unit 302 delivers a search formula pointer to a search formula acquisition unit 304. The doorbell register may be updated when the tail of the host search command queue is updated by the host 2.

Upon receiving the search formula pointer from the search command acquisition unit 302, the search formula acquisition unit 304 transfers, via DMA, the search formula stored in the host memory indicated by the search formula pointer to the SRAM 32 in the FPGA 10. Moreover, the search formula acquisition unit 304 enqueues the storage destination of the search formula in the SRAM 32 to a FPGA search state management queue.

An entry read request unit 306 dequeues one search command 100 from the FPGA search command queue and dequeues information on one search formula from the FPGA search state management queue. The entry read request unit 306 specifies search target segment data 200 from the search command 100. The entry read request unit 306 generates a read request to read the entry and the dictionary of the specified search target segment data 200. The entry and dictionary read request may include a page list (the storage destination page list of the entry and the dictionary) of the DRAM 12 which is the storage destination of the read result.

The entry read request unit 306 enqueues the entry and dictionary read request to ssd_sq.

When the entry and dictionary read request is dequeued from the ssd_sq, the FM controller 40 reads the entry and the dictionary of the search target segment data 200 from the FM and stores the same in the storage destination page list of the entry and the dictionary. Moreover, the FM controller 40 enqueues a completion response to the entry and dictionary read request to ssd_cq of the FPGA 10.

Together with the above-described process, the entry read request unit 306 delivers the storage destination of the search formula 150 in the SRAM 32 to a search formula analysis unit 308.

Upon receiving the storage destination of the search formula 150 in the SRAM 32 from the entry read request unit 306, the search formula analysis unit 308 acquires the search formula 150 from the storage destination in the SRAM 32 and analyzes the search formula 150. With this analysis, columns (search target columns) serving as the search target of the search formula 150 in the search target segment data 200 are determined. The search formula analysis unit 308 may sort the search target columns in the order of column numbers. The search formula analysis unit 308 delivers the search target columns to a column location acquisition unit 310.

An entry read completion checking unit 312 dequeues a completion response to the entry and dictionary read request from the ssd_cq and delivers the storage destination page list of the entry and the dictionary corresponding to the completion response to the column location acquisition unit 310.

The column location acquisition unit 310 receives the search target columns from the search formula analysis unit 308. Moreover, the column location acquisition unit 310 acquires the entry and dictionary read result from the storage destination page list of the entry and the dictionary received from the entry read completion checking unit 312. The column location acquisition unit 310 generates a control data structure 300 (see FIG. 8) for selecting and reading only the search target columns from the search target segment data 200 based on the search target columns and the entry and dictionary read result.

The column location acquisition unit 310 delivers the generated control data structure 300 to a column read request unit 314.

Upon receiving the control data structure 300 from the column location acquisition unit 310, the column read request unit 314 divides the control data structure 300 into portions having successive column numbers. Moreover, the column read request unit 314 generates a successive column read request with respect to the respective portions having successive column numbers. Since the portions having successive column numbers can be transferred in bulk, the efficiency of transfer from the flash storage 14 to the DRAM 12 is improved. The successive column read request may include the page list (the storage destination page list of successive columns) of the DRAM 12 serving as the storage destination of the read result. The column read request unit 314 registers the number of divisions in an FM read division count register. The column read request unit 314 enqueues the successive column read request to the ssd_sq. Moreover, when the dictionary page count read together with the entry page is smaller than the dictionary page count in the control data structure 300, a read request to read a deficient number of dictionary pages is also issued.

When the successive column read request is dequeued from the ssd_sq as described above, the FM controller 40 reads successive columns of the search target segment data 200 from the FM chip 42 and stores the successive columns in the successive column storage destination page list. Moreover, the FM controller 40 enqueues a completion response to the successive column read request to the ssd_cq of the FPGA 10.

A column read completion checking unit 316 dequeues the completion response to the successive column read request from the ssd_cq and enqueues the storage destination page list of the successive column read corresponding to the completion response to a subcommand queue.

A search circuit activation unit 318 turns ON an activation register of a FPGA search circuit 500 when it is checked that the storage destination page lists of successive column reads registered in a FM read division count register are stored in the subcommand queue. That is, when all columns to be used for search in the search target segment data 200 are stored in the DRAM 12, the search circuit activation unit 318 activates the FPGA search circuit 500. The search circuit activation unit 318 instructs a page list acquisition unit 320 to acquire the result storage page list.

Upon receiving an instruction to acquire the result storage page list from the search circuit activation unit 318, the page list acquisition unit 320 transfers, via DMA, the result storage page list in the host memory to the SRAM 32 in the FPGA 10.

The FPGA search circuit 500 loads the storage location information of each item of column data, calculates the column storage address appearing in the search formula 150, loads the column data to be used for search in units of pages, and stores the same in the SRAM 32 in the FPGA 10. Although the SRAM 32 has a capacity required for pipeline-processing only one item of segment data 200, since the SRAM 32 has a small access time, the FPGA search circuit 500 loads a certain number of records of data from the SRAM 32, determines the search condition, and executes an aggregate function on the hit records. When the search process on the segment data 200 is completed, the FPGA search circuit 500 enqueues the completion response to a FPGA search completion queue.

A search circuit completion processing unit 322 dequeues a completion response of the search process on one segment data 200 (that is the search command 100 of one host 2) from the FPGA search completion queue and issues an execution instruction to a host response unit 324.

Upon receiving an execution instruction from the search circuit completion processing unit 322, the host response unit 324 transfers, via DMA, the completion response on the search command 100 of the host 2 to a host search completion queue. With this process, the host 2 can acquire a search result 101 on the search command 100.

Figure 8:
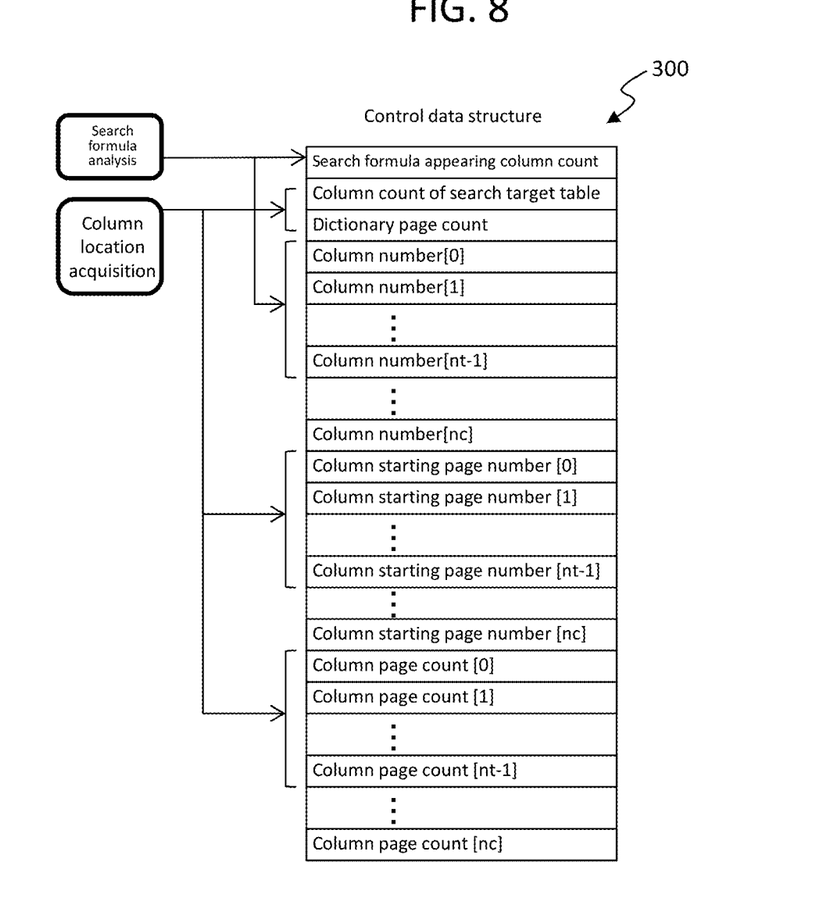
FIG. 8 is a diagram illustrating an example of a control data structure.

FIG. 8 illustrates an example of the control data structure 300 for selecting and reading the column data to be used for search only.

The control data structure 300 is a structure for managing search target columns. The control data structure 300 may include, as its item values, a search formula appearing column count, a search target table column count, a dictionary page count, a column number, a column starting page number, and a column page count. The search formula appearing column count is the number of columns appearing in the search formula. The search target table column count is the number of columns included in a search target database table. The dictionary page count is the number of dictionary pages. Each column number is the number of the search target column in the search target segment data 200. These column numbers may be sorted in ascending order of numbers. Each column starting page number is the starting page number of a column storage area corresponding to each column number in the search target segment data 200. Each column page count is the number of pages of a column storage area corresponding to each column number in the search target segment data. The column number, the column starting page number, and the column page count may be correlated with each other in one-to-one-to-one correlation. In the example of FIG. 8, the column number "0," the column starting page "0," and the column page count "0" are correlated with each other. The search formula appearing column count and the respective column numbers may be specified by the search formula analysis unit 308. The column count of the control data structure 300, the dictionary page count, the respective column starting page number, and the respective column page count may be specified by the column location acquisition unit 310.

Figure 9:
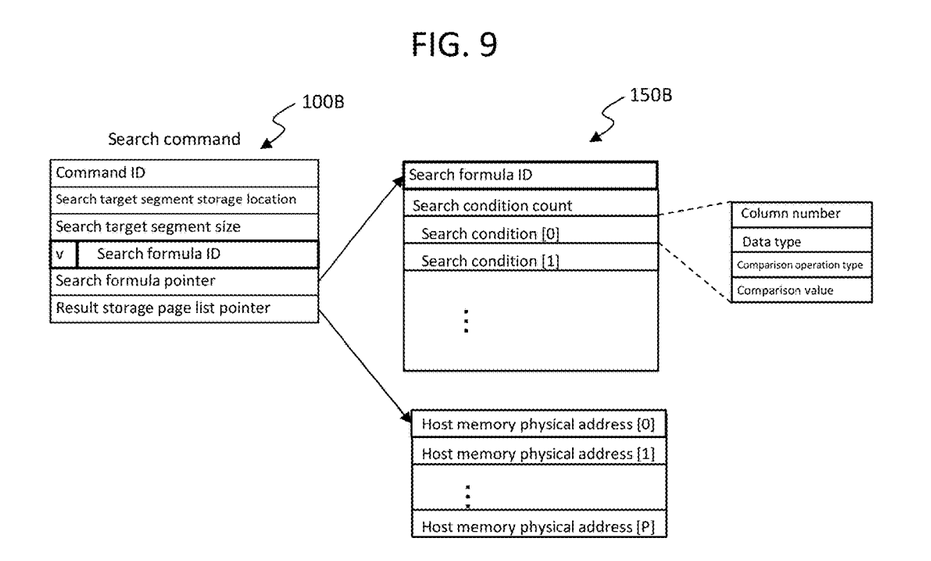
FIG. 9 is a diagram illustrating a modified example of a search command data format and a search formula.
Figure 10:
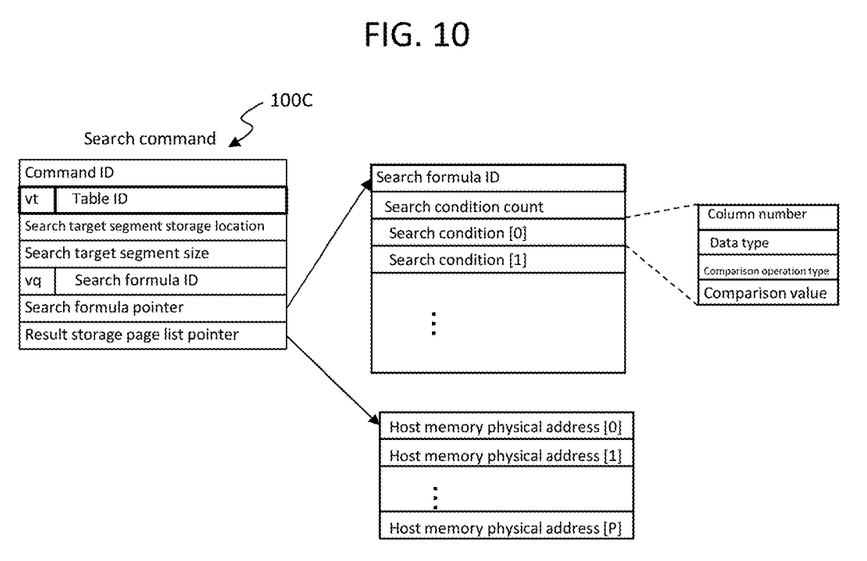
FIG. 10 is a diagram illustrating a modified example of a search command data format and a search formula.

FIGS. 9 and 10 illustrate a modified example of the search command 100 and the search formula 150.

A search command 100B and a search formula 150B in FIG. 9 are different from the search command 100A and the search formula 150A in FIG. 4 in that the former have a search formula ID for identifying a search formula. A search command 100C in FIG. 10 is different from the search command 100B in FIG. 9 in that the former has a table ID for identifying a search target table. Next, an operation example of the configuration of FIG. 10 will be described.

Figure 11:
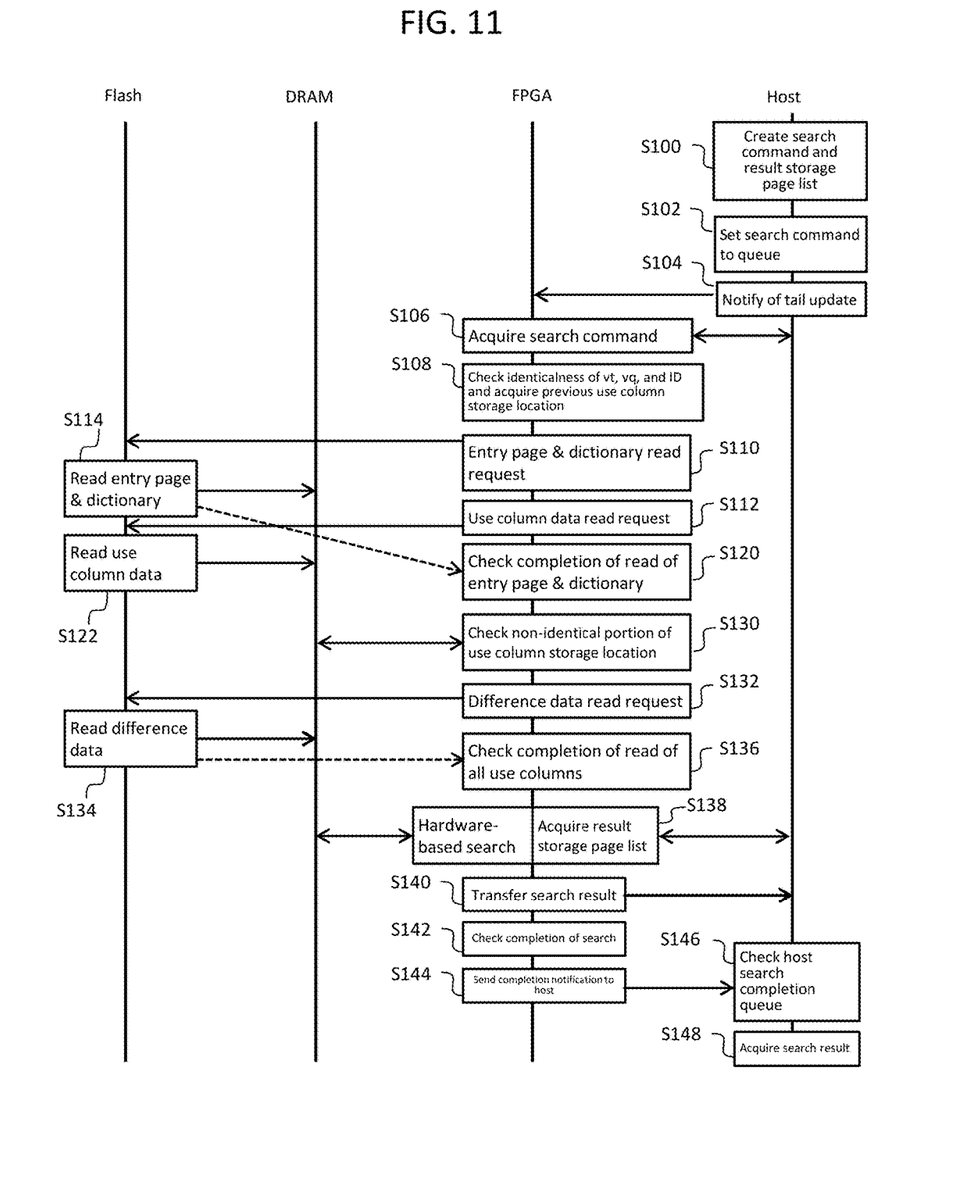
FIG. 11 is a sequence chart illustrating a modified example of an operation of an information processing apparatus.

FIG. 11 is a sequence chart illustrating an example of an operation of an information processing apparatus which uses the search command 100C and the search formula 150C illustrated in FIG. 10.

(S100 to S104)

The host 2 performs the same processes as S10 to S14 in FIG. 3.

(S106)

Upon receiving a tail update notification from the host 2, the FPGA 10 acquires the search command 100C from the host 2. After that, the flow proceeds to the process of S108.

(S108)

When the command ID, the table ID, and the search formula ID of the search command 100C are identical to those of the previous search command 100C, the FPGA 10 specifies the previous use column storage location. After that, the flow proceeds to the process of S110.

(S110)

The FPGA 10 issues an entry page and dictionary read request to the flash storage 14. After that, the flow proceeds to the process of S112.

(S112)

The FPGA 10 issues a use column read request without waiting for the completion of the process of S114 by the flash storage 14. The use column read request may include the previous use column storage location specified in S108. In this way, it is possible to eliminate the process of S22 in FIG. 3.

(S114)

Upon receiving the entry page and the dictionary read request from the FPGA 10, the flash storage 14 reads the entry 202 and the dictionary 204 in the segment data 200 and stores the same in the DRAM 12. When the storage is completed, the flash storage 14 issues a completion notification to the FPGA 10.

(S120)

Upon receiving a notification of completion of S114 from the flash storage 14, the FPGA 10 performs the process of S130.

(S130)

The FPGA 10 specifies the storage location of difference data from the previous use column storage location specified in S108 using the entry page 202 and the dictionary 204 stored in the DRAM 12. After that, the flow proceeds to the process of S132.

(S132)

The FPGA 10 issues a difference data read request to the flash storage 14. The difference data read request may include the storage location of the difference data specified in S130.

(S134)

Upon receiving the difference data read request from the FPGA 10, the flash storage 14 reads the difference data from the difference data storage location included in the read request and stores the same in the DRAM 12. In this way, it is possible to reduce the amount of data transferred from the flash storage 14 to the DRAM 12. When the storage is completed, the flash storage 14 issues a completion notification to the FPGA 10.

(S136)

Upon receiving a notification of completion of S134 from the flash storage 14, the FPGA 10 performs the process of S138.

(S138 to S144)

The FPGA 10 performs the same processes as S36 to S42 in FIG. 3.

(S146 to S148)

The host 2 performs the same processes as S44 to S46 in FIG. 3.

The embodiment of the present invention described above is an example to describe the present invention and the range of the present invention is not limited by the embodiment only. The present invention can be embodied in a variety of other aspects by those skilled in the art without departing from the scope of the present invention.

What is claimed is:

1. An information processing apparatus comprising:
a dynamic random access memory (DRAM);
a plurality of storage devices; and
a field programmable gate array (FPGA),
wherein:
the plurality of storage devices are configured to store a plurality of items of segment data which are constituent elements of a column store database which includes a plurality of columns,
each item of segment data respectively includes an entry page and a plurality of data storage pages, the entry page having configuration information on a configuration of the data storage pages thereof, and the plurality of data storage pages having column data of at least part of one or more of the columns,
the FPGA is configured to:
receive, from a host computer, a search command in which a search target segment data, which is one of the items of segment data, and a search formula for the search target segment data are described,
control the configuration information in the entry page of the search target segment data to be read from the plurality of the storage devices into the DRAM,
analyze the search formula to specify one or more of the columns to be searched,
specify, from the configuration information in the DRAM, a storage location of the data storage pages having the specified one or more columns in the search target segment data,
control the column data at the storage location of the specified one or more columns to be read from the plurality of the storage devices in which the search target segment data is stored into the DRAM,
execute a search on the read column data in the DRAM, and
return a result of the search to the host computer.

2. The information processing apparatus according to claim 1, wherein
each item of the segment data further respectively includes one or more dictionary pages having dictionary information for decrypting the column data of the one or more of the columns included in the data storage pages thereof, and
the FPGA is configured to control the configuration information in the entry page and the dictionary information in the dictionary pages of the search target segment data to be read from the plurality of the storage devices into the DRAM.

3. The information processing apparatus according to claim 2, wherein
the FPGA is configured to execute, in parallel, the reading of the configuration information and the dictionary information from the plurality of storage devices and the analyzing of the search formula.

4. The information processing apparatus according to claim 2, wherein
each item of segment data respectively includes the dictionary pages disposed successively after the entry page.

5. The information processing apparatus according to claim 4, wherein the FPGA is configured to control the configuration information in the entry page and the dictionary information in the dictionary pages of the search target segment data to be collectively read from the plurality of the storage devices into the DRAM.

6. The information processing apparatus according to claim 2, wherein
the configuration information includes a respective location of each item of the column data in the data storage pages thereof, a page count of each item of the column data in the data storage pages thereof, and a compression format of each item of the column data in the data storage pages thereof.

7. The information processing apparatus according to claim 2, wherein
the FPGA has an internal memory, and
the FPGA is configured to read the dictionary information from the DRAM into the internal memory and decrypt the column data included at the storage location of the specified one or more columns.

8. A processing apparatus comprising:
a DRAM;
a plurality of storage devices configured to store a plurality of items of segment data which are constituent elements of a column store database which includes a plurality of columns, wherein each item of segment data respectively includes an entry page and a plurality of data storage pages, the entry page having configuration information on a configuration of the data storage pages thereof, and the plurality of data storage pages having column data of at least part of one or more of the columns,
a programmable logic device which includes a static random access memory (SRAM) and is configured to:
receive, via direct memory access (DMA) from a host computer, a search command in which a search target segment data, which is one of the items of segment data, and a search formula for the search target segment data are described, control the configuration information in the entry page of the search target segment data to be read from the plurality of the storage devices into the DRAM, analyze the search formula to specify one or more of the columns to be searched specify, from the configuration information in the DRAM, a storage location of the data storage pages having the specified one or more columns in the search target segment data, control the column data at the storage location of the specified one or more columns to be read from the plurality of the storage devices in which the search target segment data is stored into the DRAM, load the column data from the DRAM to the SRAM, execute a search on the read column data in the SRAM, and return, via DMA to the host computer, a result of the search.

9. A method to search a column store database which includes a plurality of columns that are distributed on a plurality of storage devices that are configured to store a plurality of items of segment data which are constituent elements of the column store database, and each item of segment data respectively includes an entry page and a plurality of data storage pages, the entry page having configuration information on a configuration of the data storage pages thereof, and the plurality of data storage pages having column data of at least part of one or more of the columns, the method executed by a programmable logic device and comprising:

receiving, from a host computer, a search command in which a search target segment data, which is one of the items of segment data, and a search formula for the search target segment data are described, controlling the configuration information in the entry page of the search target segment data to be read from the plurality of the storage devices into a DRAM, analyzing the search formula to specify one or more of the columns to be searched, specifying, from the configuration information in the DRAM, a storage location of the data storage pages having the specified one or more columns in the search target segment data, controlling the column data at the storage location of the specified one or more columns to be read from the plurality of the storage devices in which the search target segment data is stored into the DRAM, execute a search on the read column data in the DRAM, and returning, the host computer, a result of the search.

10. The method according to claim 9, wherein each item of the segment data further respectively includes one or more dictionary pages having dictionary information for decrypting the column data of the one or more of the columns included in the data storage pages thereof, and controlling the configuration information in the entry page and the dictionary information in the dictionary pages of the search target segment data to be read from the plurality of the storage devices into the DRAM.

11. The method according to claim 10, wherein the reading of the configuration information and the dictionary information from the plurality of storage devices and the analyzing of the search formula are executed in parallel.

12. The method according to claim 10, wherein each item of segment data respectively includes the dictionary pages disposed successively after the entry page.

13. The method according to claim 10, wherein the configuration information in the entry page and the dictionary information in the dictionary pages of the search target segment data to be collectively read from the plurality of the storage devices into the DRAM.

14. The method according to claim 10, wherein the configuration information includes a respective location of each item of the column data in the data storage pages thereof, a page count of each item of the column data in the data storage pages thereof, and a compression format of each item of the column data in the data storage pages thereof.

15. The method according to claim 10, further comprising:

reading the dictionary information from the DRAM into an internal memory of the FPGA and decrypting the column data included at the storage location of the specified one or more columns.

* * * * *